United States Patent
Yu et al.

(10) Patent No.: US 9,337,748 B2
(45) Date of Patent: May 10, 2016

(54) SYSTEM AND METHOD FOR A DC-TO-DC POWER CONVERTER WITH INVERTER STAGE COUPLED TO THE DC INPUT

(71) Applicant: Infineon Technologies Austria AG, Villach (AT)

(72) Inventors: Weifu Yu, Singapore (SG); Yi Tang, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 177 days.

(21) Appl. No.: 13/958,206

(22) Filed: Aug. 2, 2013

(65) Prior Publication Data

US 2015/0036403 A1    Feb. 5, 2015

(51) Int. Cl.
| | |
|---|---|
| H02M 7/487 | (2007.01) |
| H02M 7/5387 | (2007.01) |
| H02J 3/38 | (2006.01) |
| G05F 1/67 | (2006.01) |
| H02M 1/00 | (2006.01) |

(52) U.S. Cl.
CPC ............. *H02M 7/5387* (2013.01); *H02J 3/383* (2013.01); *G05F 1/67* (2013.01); *H02M 7/487* (2013.01); *H02M 2001/007* (2013.01)

(58) Field of Classification Search
CPC ... G05F 1/67; H02M 2001/007; H02M 7/487; H02M 7/49; H02M 7/483
See application file for complete search history.

(56) References Cited

U.S. PATENT DOCUMENTS

| | | | | |
|---|---|---|---|---|
| 4,564,895 | A | * | 1/1986 | Glennon ......................... 363/41 |
| 2009/0236917 | A1 | * | 9/2009 | Bettenwort et al. ............ 307/82 |
| 2010/0302819 | A1 | * | 12/2010 | O'Brien et al. ................. 363/95 |
| 2013/0301314 | A1 | * | 11/2013 | Fu et al. .......................... 363/37 |
| 2014/0217827 | A1 | * | 8/2014 | Cheek et al. .................... 307/66 |

FOREIGN PATENT DOCUMENTS

EP    2053732    4/2009

OTHER PUBLICATIONS

Peng, Fang Zheng, "Z-Source Inverter," IEEE Transactions on Industry Applications, vol. 39, No. 2, Mar./Apr. 2003, pp. 504-510.
Schimpf, Fritz, "Grid connected Converters for Photovoltaic, State of the Art, Ideas for Improvement of Transformerless Inverters," NORPIE/2008, Nordic Workshop on Power and Industrial Electronics, Jun. 9-11, 2008, 6 pages.

\* cited by examiner

*Primary Examiner* — Harry Behm
(74) *Attorney, Agent, or Firm* — Shumaker & Sieffert, P.A.

(57) ABSTRACT

In accordance with a preferred embodiment of the present invention, an inverter circuit includes a direct current (DC)-to-DC power converter configured to receive an input energy from a device via a first input terminal and a second input terminal, where the DC-to-DC power converter is configured to convert a first portion of the input energy to a DC energy. The inverter circuit also includes an inverter stage coupled to an output of the DC-to-DC power converter, and is connected to the first input terminal of the DC-to-DC power converter and the second input terminal of the DC-to-DC power converter, where the inverter stage is configured to convert a second portion of the input energy to a first output energy.

20 Claims, 12 Drawing Sheets

US 9,337,748 B2

SYSTEM AND METHOD FOR A DC-TO-DC POWER CONVERTER WITH INVERTER STAGE COUPLED TO THE DC INPUT

TECHNICAL FIELD

The present invention relates generally to circuits, and, in particular, to a system and method for a power converter.

BACKGROUND

Photovoltaic systems use photovoltaic panels to convert sunlight into electricity. A photovoltaic system may contain one or more inverters, also known as a direct current (DC) to alternating current (AC) power converters. Electricity generated by a photovoltaic system may be stored, directly used, fed into a power grid, or combined with other power generators.

Inverters used in photovoltaic systems may include stand-alone inverters, grid-tie inverters, and battery backup inverters. Stand-alone inverters are used in isolated systems where the inverter draws DC energy from batteries charged by the photovoltaic system. Battery backup inverters are designed to draw energy from a battery, manage the battery charge, and export excess energy to the power grid. Some inverters may use maximum power point tracking (MPPT) to convert the maximum power from the DC input to the AC output.

Grid connection inverters supply AC power in a sinusoidal form synchronized to the power grid at the grid frequency, where the voltage is capped at the grid voltage. The AC output is disconnected from the grid if the grid voltage is turned off to provide anti-islanding protection. Thus, grid connection inverters do not provide back-up power during utility outages. An island exists when power is fed to a small section of the power grid, and may present a risk to workers who expect the area to be unpowered. Also, without a grid signal to synchronize to, the power output of the inverters may drift from the tolerances required by customer equipment connected to the island.

SUMMARY OF THE INVENTION

In accordance with a preferred embodiment of the present invention, an inverter circuit includes a direct current (DC)-to-DC power converter configured to receive an input energy from a device via a first input terminal and a second input terminal, and is configured to convert a first portion of the input energy to a DC energy. The inverter circuit further includes an inverter stage coupled to an output of the DC-to-DC power converter that is connected to the first input terminal of the DC-to-DC power converter and the second input terminal of the DC-to-DC power converter. The inverter stage is configured to convert a second portion of the input energy to a first output energy.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a system and method for a power converter. The invention may also be applied, however, to other types of circuits, systems, and methods, such as other power supply circuits, systems, and methods.

An embodiment power converter converts a DC input voltage into an AC output voltage. The power converter includes a DC-to-DC power converter and two inverters that convert a DC voltage to an AC voltage. One inverter converts the output voltage of the DC-to-DC power converter to an AC output voltage, while the other inverter converts a portion of the input DC voltage to the AC output voltage. In some embodiments, the other inverter also converts a portion of the output voltage of the DC-to-DC power converter to the AC output voltage.

Figure 1:
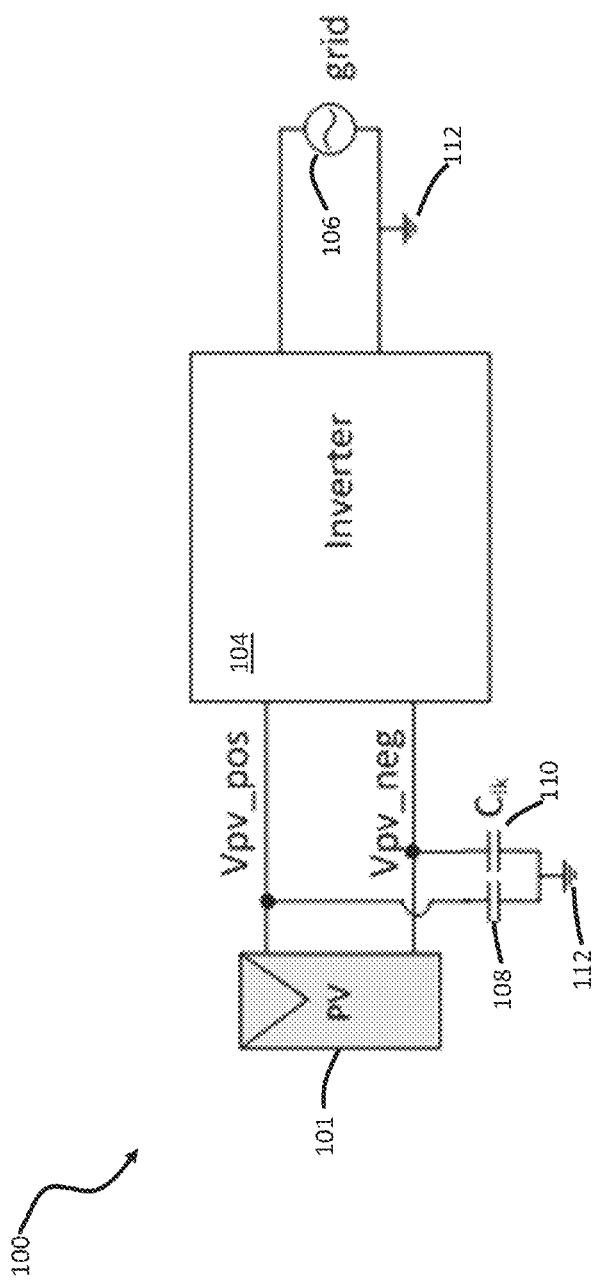
FIG. 1 illustrates an embodiment power converter system.

FIG. 1 shows power converter system 100 that may be used to transfer power from photovoltaic panel 101 to power grid 106. Photovoltaic panel (PV) 101 produces a direct current (DC) output, including a positive output voltage (Vpv_pos) and a negative output voltage (Vpv_neg) by converting solar energy to electrical energy. Leakage capacitance 108 couples the positive voltage to ground 112, while leakage capacitance 110 couples the negative output voltage to ground 112. The positive and negative output voltages are coupled to inverter 104, which converts the DC output voltages into an alternating current (AC) voltage that is coupled to power grid 106.

Leakage capacitance 108 and leakage capacitance 110 represent parasitic capacitance from the terminals of the photovoltaic cell to ground. This leakage capacitance may be present, for example, from the terminals of the photovoltaic cell to the ground frame or chassis of the photovoltaic cell. In another example, a leakage capacitance may be present in the case where inverter 104 is a single phase inverter, and the negative phase output of photovoltaic panel 101 is grounded. Grounding the chassis of the photovoltaic cell ensures safety of the system, reduces electromagnetic interference (EMI), and mitigates common mode current. However, a high switching frequency to ground may cause a high leakage current that may cause deterioration of the transparent conductive oxide (TCO) layer for thin film photovoltaic panels, thereby reducing the lifetime of the panels. Moreover, the surface polarization effect caused by a positive bus voltage for back-contact crystalline photovoltaic panels may further deteriorate the photovoltaic panel.

Figure 2:
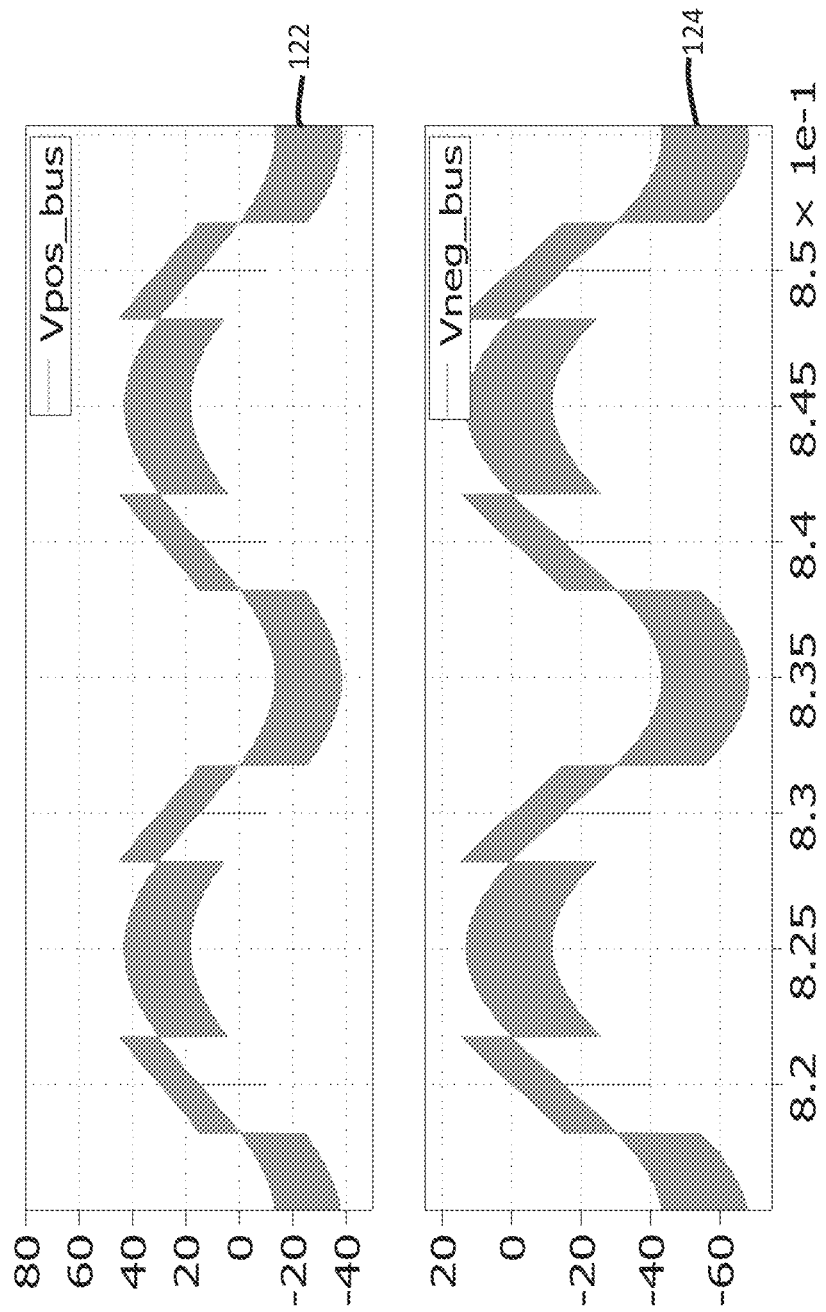
FIG. 2 illustrates voltage versus time graphs of bus voltage.

FIG. 2 illustrates graphs of voltage versus time for power converter system 100. Curve 122 represents the voltage of the positive output voltage of photovoltaic panel 101 versus time, while curve 124 represents the voltage of the negative output voltage of photovoltaic panel 101 versus time. The ground voltage follows the switching frequency with a significant variation.

Figure 3:
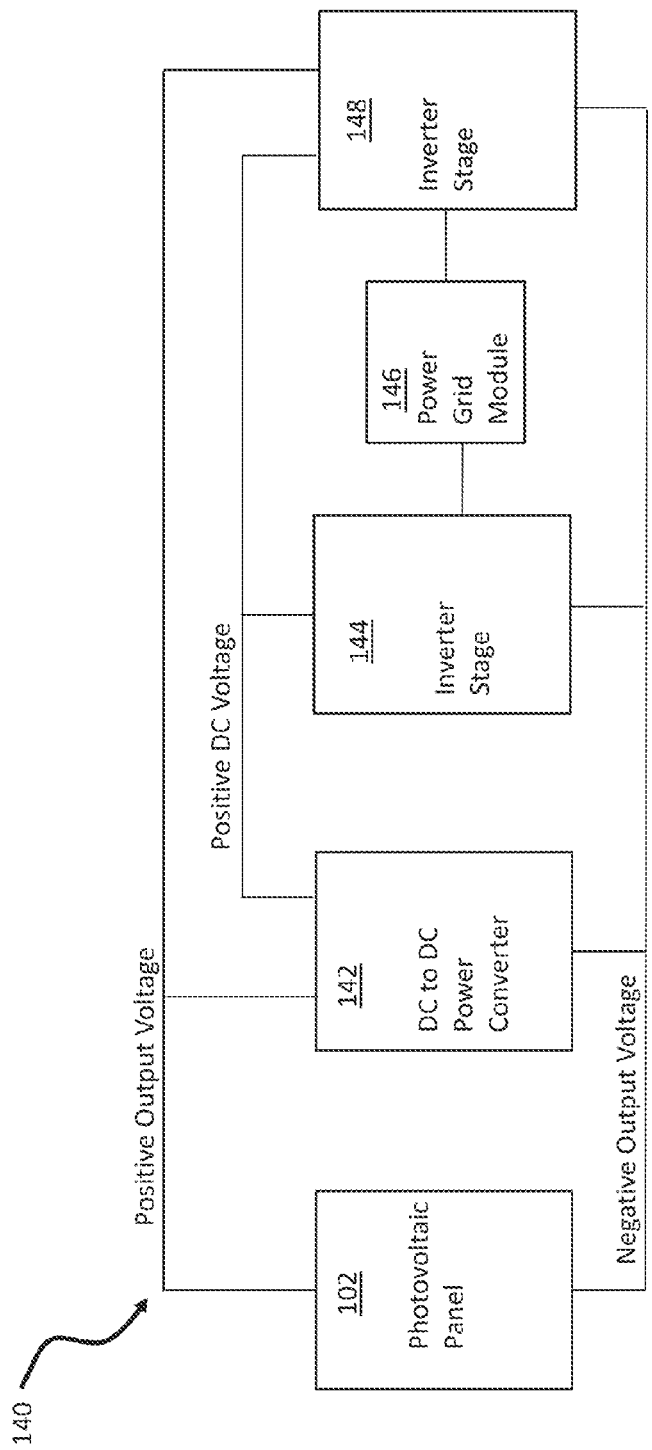
FIG. 3 illustrates a block diagram of an embodiment power converter system.

FIG. 3 illustrates embodiment power converter system 140. Photovoltaic panel 102, which produces a positive output voltage and a negative output voltage by converting solar energy to electrical energy through the photovoltaic effect, may be an assembly of photovoltaic cells. In some examples, photovoltaic cells contain wafer based crystalline silicon cells or thin-fill cadmium telluride or silicon cells. Sunlight causes the creation of electron-hole pairs within pn junctions disposed within the photovoltaic cells, leading to a current flow accumulation that creates a DC voltage.

The positive output voltage and negative output voltage are coupled to DC-to-DC power converter 142. DC-to-DC power converter 142 may be implemented using a switched-mode power supply such as a boost converter, a buck converter, or other DC-to-DC converter types, such as LLC converters or Phase-Shifted Full-Bridge converters. DC-to-DC power converter 142 has an output voltage that is greater than its input voltage.

The outputs of DC-to-DC power converter 142 are coupled to inverter stage 144 and inverter stage 148. Inverter stage 144 converts a portion of the DC voltage to an AC voltage, which is fed to power grid module 146. Similarly, inverter stage 148 converts a portion of the DC voltage to an AC voltage, which is fed to power grid module 146. Additionally, inverter stage 148 converts a portion of the output voltage from photovoltaic panel 102 to an AC voltage fed to power grid module 146. Thus, energy output by photovoltaic panel 102 is transferred to power grid module 146.

Figure 4:
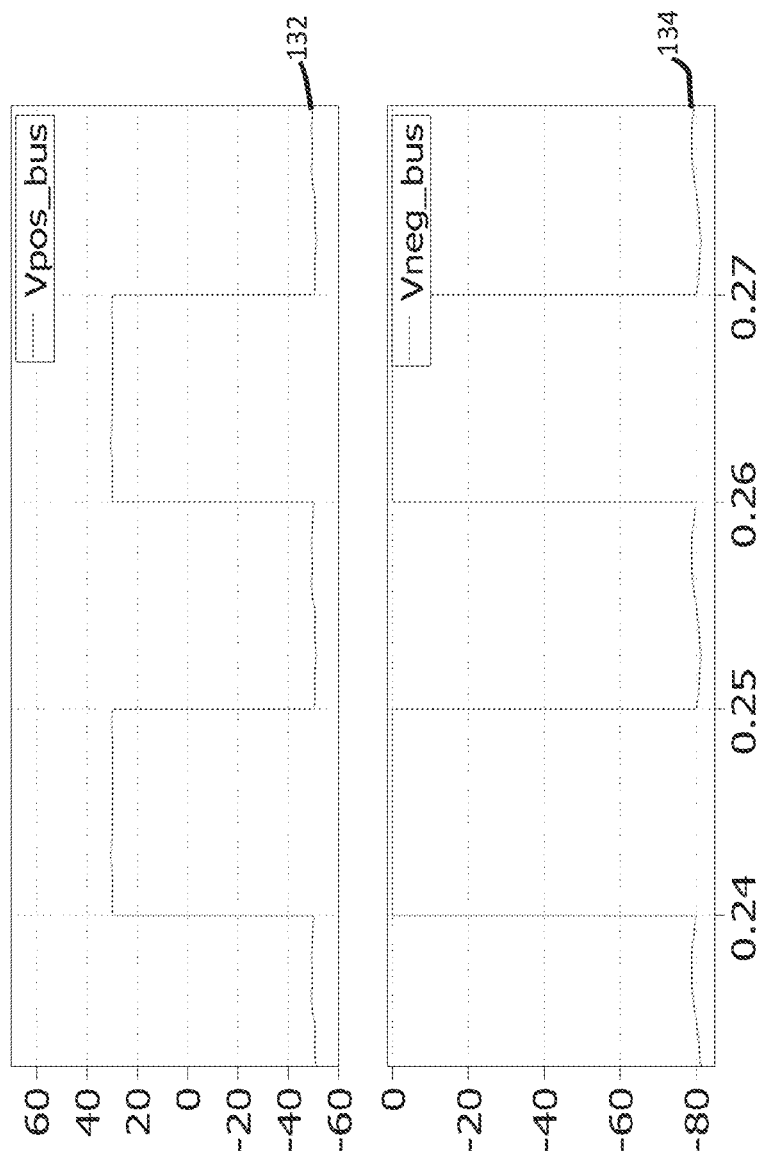
FIG. 4 illustrates voltage versus time graphs of bus voltage.

On the other hand, FIG. 4 illustrates graphs of voltage versus power earth for power converter system 140, illustrated in FIG. 3. Curve 132 shows the voltage of the positive output voltage of photovoltaic panel 102 versus power earth, while curve 134 shows the negative output voltage of photovoltaic panel 102 versus power earth. In power converter system 140, the leakage current is low because the majority of the current provided to the output is switched at a low frequency. The graphs in FIG. 4 depict an example with no reactive power demanded by the circuit. When reactive power is needed, switching losses may slightly increase.

Figure 5:
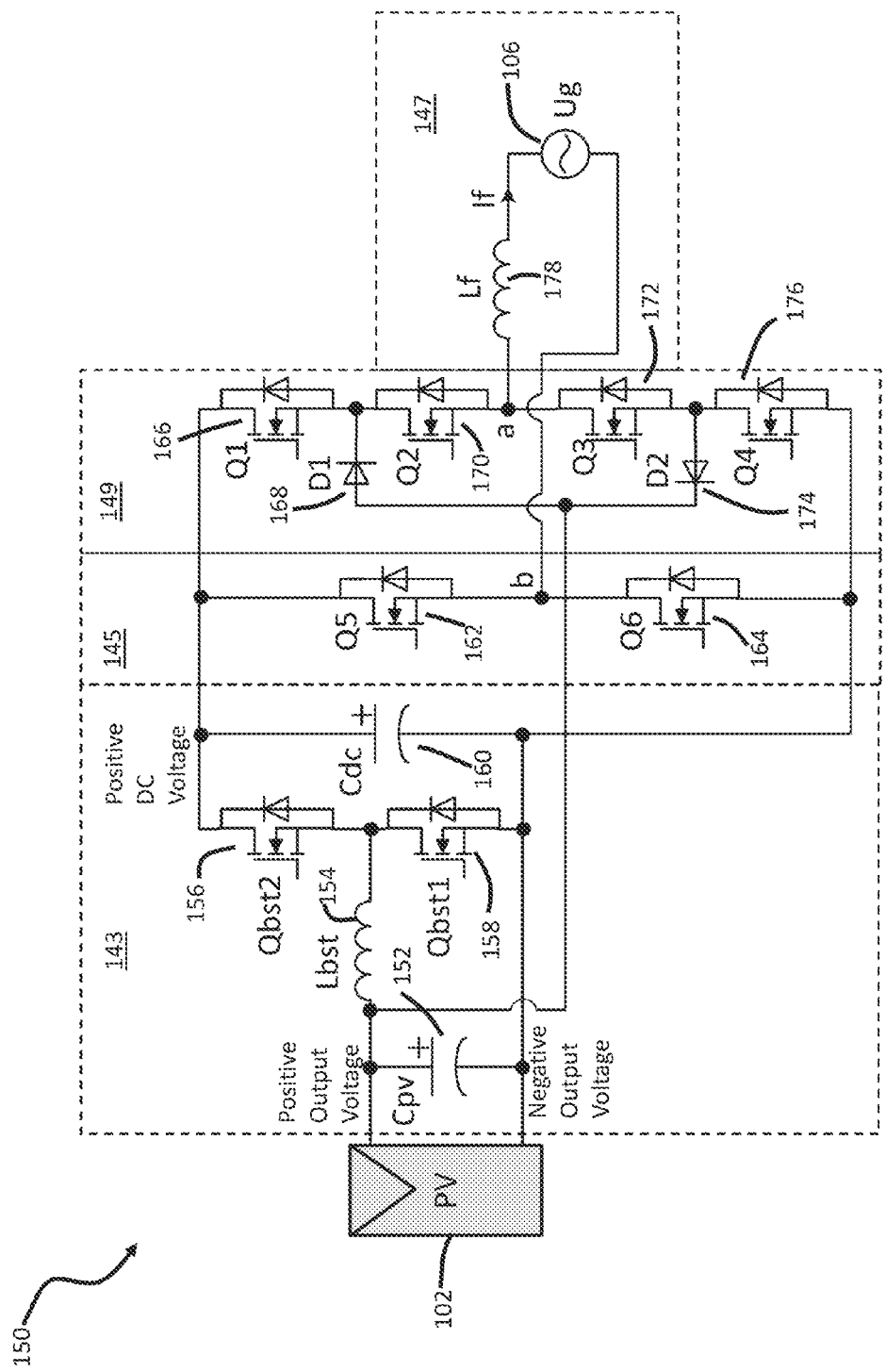
FIG. 5 illustrates a schematic of an embodiment power converter circuit.

FIG. 5 illustrates power converter circuit 150, which may, for example, be used to implement power converter system 140. Photovoltaic panel 102 is coupled to DC-to-DC power converter 143. Filtering of high frequency noise is provided by capacitor 152 (Cpv), which is coupled between the positive output and the negative output of photovoltaic panel 102. The positive output of photovoltaic panel 102 is coupled to inductor 154 (Lbst), which resists an instantaneous change in current. Transistor 158 (Qbst1) is coupled between inductor 154 and the negative output of photovoltaic panel 102. Also, transistor 156 (Qbst2) is coupled between transistor 158 and the positive DC output of DC-to-DC power converter 143. Transistor 156 is operated to achieve synchronous rectification to increase the efficiency of DC-to-DC power converter 143. In one example, transistor 156 and transistor 158 are n-channel metal oxide semiconductor field effect transistors (MOSFETs). Alternatively, transistor 156 and 158 may be p-channel MOSFETS, or other transistor types may be used. Capacitor 160 (Cdc) is coupled between the DC output of DC-to-DC power converter 143 and the negative output voltage of photovoltaic panel 102. DC-to-DC power converter 143 is controlled by the duty cycle of transistor 158, which is switched in a complimentarily manner with respect to transistor 156. When transistor 158 is closed, current flows through inductor 154, and energy is stored in inductor 154. When transistor 158 is open, the current flowing through inductor 154 is reduced, and current flows through transistor 156 to charge capacitor 160. Only a portion of the output power from photovoltaic panel 102 is transferred by DC-to-DC power converter 143.

The output of DC-to-DC power converter 143 is coupled to inverter stage 145, which converts the DC input to an AC output. Inverter stage 145 is a two-level bridge. Transistor 162 (Q5) and transistor 164 (Q6) are configured in series between the positive DC output of DC-to-DC power converter 143 and the negative output voltage. In one example, transistor 162 and transistor 164 are implemented as MOSFETs. Transistor 162 and transistor 164 operate with opposite duty cycles, so one transistor is always open, while the other transistor is closed.

The AC output of inverter stage 145 is coupled to power grid module 147. Power grid module 147 contains power grid 106 (Ug) and inductor 178 (Lf). Thus, the AC power output by inverter stage 145 is output to power grid 106.

Inverter stage 149 directly converts a portion of the energy output by photovoltaic panel 102 while bypassing DC-to-DC power converter 143. In an embodiment, inverter stage 149 is implemented using a a neutral point clamped three-level bridge and is coupled to the Dc output of DC-to-DC power converter 143 and to power grid module 147. Also, inverter stage 149 is coupled to the output of photovoltaic panel 102. Transistor 166 (Q1), transistor 170 (Q2), transistor 172 (Q3), and transistor 176 (Q4) are configured in series between the outputs of DC-to-DC power converter 143. In one example, transistors 166, 170, 172, and 176 are MOSFETs. The midpoint between transistor 170 and transistor 172 is coupled to power grid module 147. Also, diode 174 (D2) is coupled from the midpoint between transistor 172 and transistor 176 to the positive output of photovoltaic panel 102. Similarly, diode 168 is coupled between the positive output of photovoltaic panel 102 and the midpoint between transistor 166 and transistor 170. The midpoint of the clamping diodes (diode 168 and diode 174) is connected to the positive output voltage of photovoltaic panel 102.

Inverter stage 149 converts the output voltage of photovoltaic panel 102 and/or the output voltage of DC-to-DC power converter 143 to an AC that is output to power grid 106. When the voltage of power grid 106 is positive and less than the output of photovoltaic panel 102, inverter stage 149 directly converts the power output by photovoltaic panel 102 while bypassing DC-to-DC power converter 143. Transistor 166 is off, while transistor 170 is the main switching transistor. The body diodes of transistor 172 and transistor 176 form a freewheeling path when transistor 170 is off.

Figure 6:
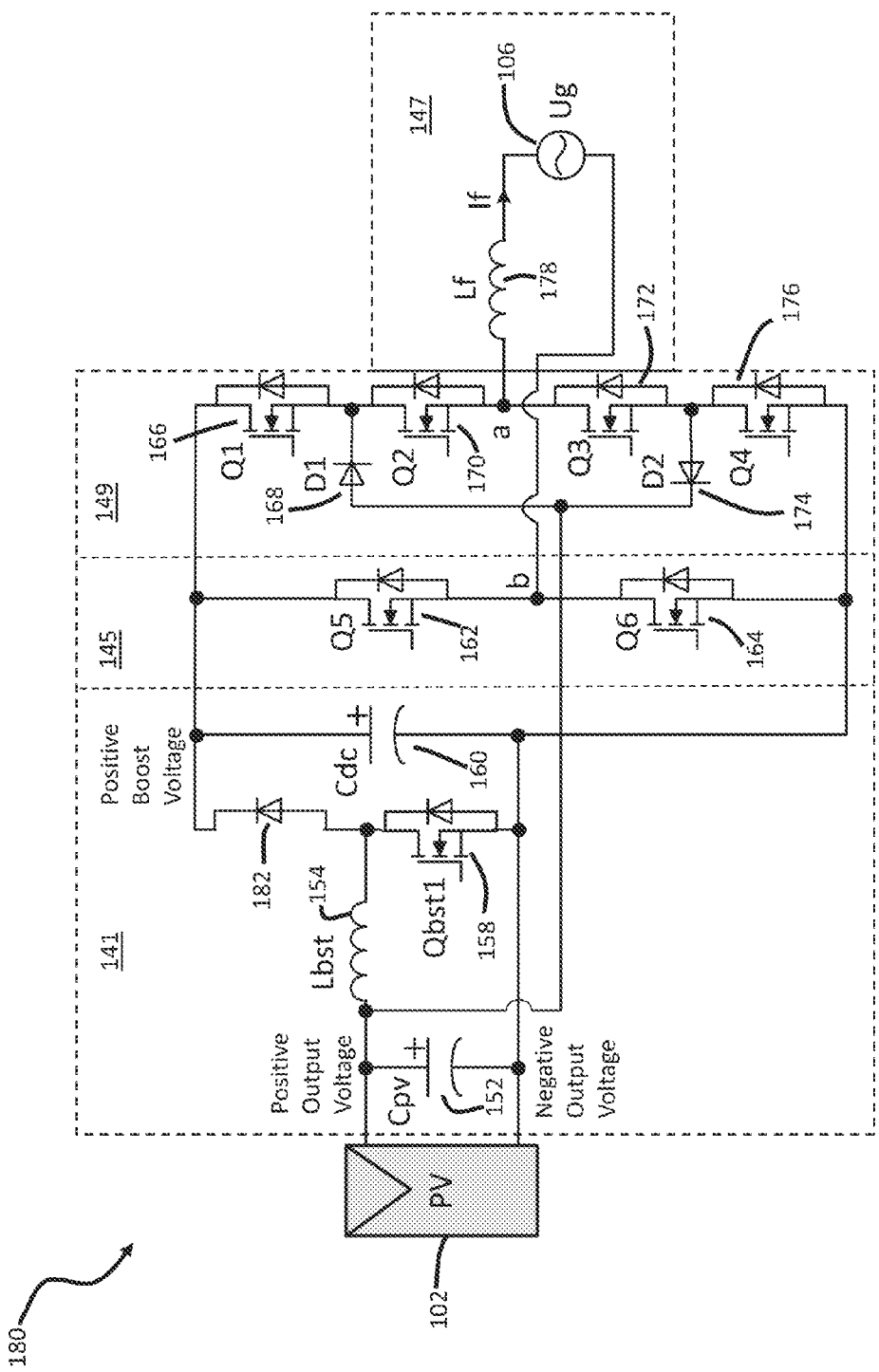
FIG. 6 illustrates a schematic of another embodiment power converter circuit.

FIG. 6 illustrates power converter circuit 180, that includes photovoltaic panel 102, inverter stage 145, inverter stage 149, and power grid module 147, which are similar to those in power converter circuit 150, except transistor 156 in DC-to-DC power converter 143 has been replaced with diode 182 in DC-to-DC power converter 141. The positive output of photovoltaic panel 102 is coupled to inductor 154 (Lbst), and transistor 158 (Qbst1) is coupled between inductor 154 and the negative output of photovoltaic panel 102. Also, diode 182 is coupled between transistor 158 and the positive DC output of DC-to-DC power converter 143. DC-to-DC power converter 143 is controlled by the duty cycle of transistor 158. When transistor 158 is closed, current flows through inductor 154, and energy is stored in inductor 154. When transistor 158 is open, the current flowing through inductor 154 is reduced, and current flows through diode 182 to charge capacitor 160.

Figure 7:
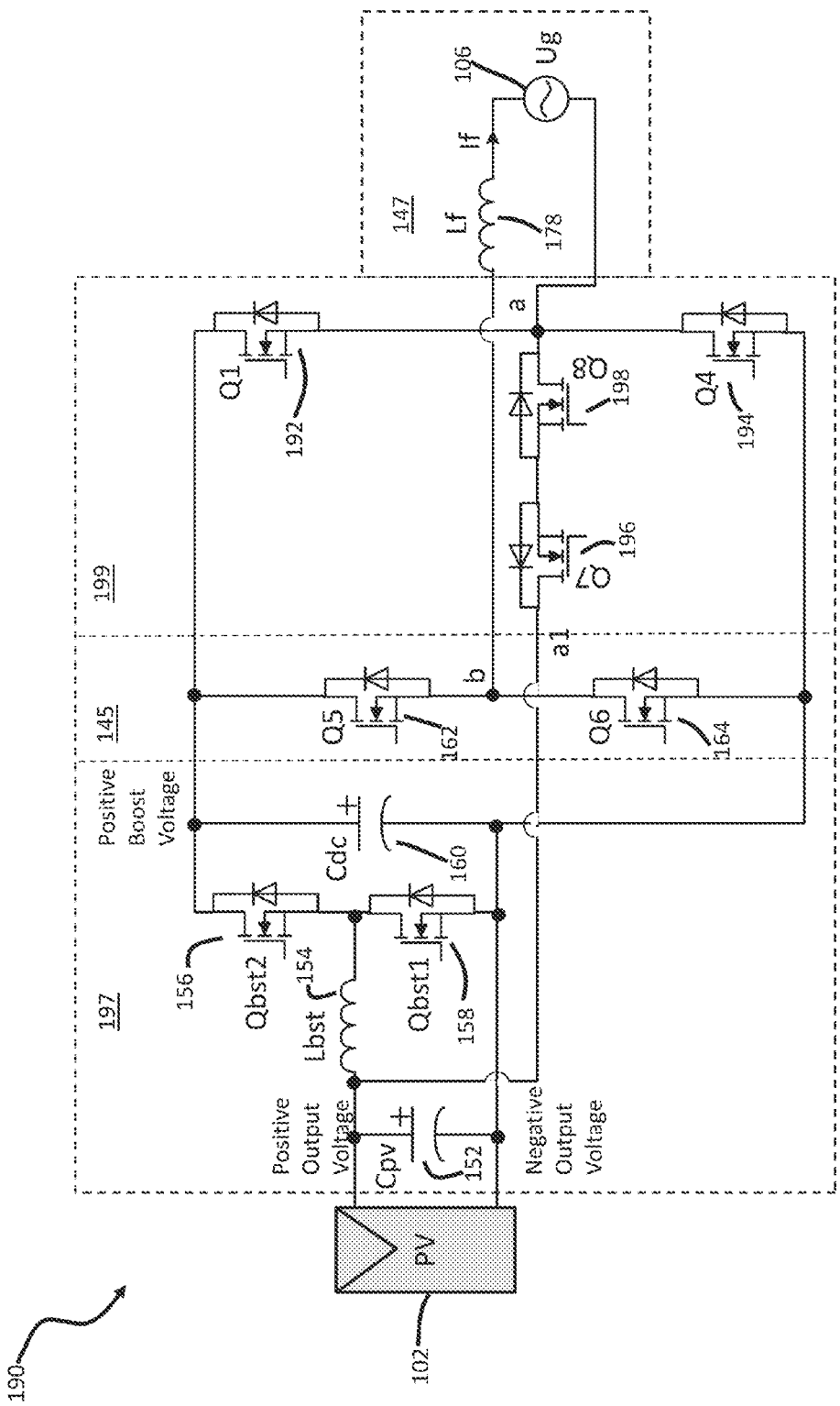
FIG. 7 illustrates a schematic of an additional embodiment power converter circuit.

FIG. 7 illustrates power converter circuit 190 that includes photovoltaic panel 102, inverter stage 145, and power grid module 147, which are similar to those in power converter circuit 150. In one example, DC-to-DC power converter 197 is similar to DC-to-DC power converter 143 in power converter circuit 150. In another example, DC-to-DC power converter 197 is similar to DC-to-DC power converter 141 in power converter circuit 180. DC-to-DC power converter 197 converts a portion of the power output by photovoltaic panel 102 to a DC output power. Also, inverter stage 145 converts a portion of the power output by DC-to-DC power converter 197 to an AC output, which is output to power grid module 147.

Inverter stage 199 is coupled to the DC output of DC-to-DC power converter 197. Transistor 192 and transistor 194 are coupled in series between the outputs of DC-to-DC power converter 197. In an example, transistor 192 and transistor 194 are MOSFETs. The midpoint between transistor 192 and transistor 194, the AC output, is coupled to power grid module 147. Transistor 198 (Q8) and transistor 196 (Q7) are coupled in series between the AC output of inverter stage 199 and the positive output of photovoltaic panel 102. Thus, inverter stage 199 converts a portion of the output of photovoltaic panel 102 directly to an AC output. Inverter stage 199 contains two fewer diodes than inverter stage 149.

When the voltage of power grid 106 is positive and less than the voltage of photovoltaic panel 102, transistor 164 is on and clamped to the negative DC output voltage of DC-to-DC power converter, and transistor 192 functions as the main switching transistor, and transistors 162 and 198 are off. The body diode of transistor 194 acts as a freewheeling path when transistor 196 is off. The power is drawn directly from photovoltaic panel 102, bypassing DC-to-DC power converter 197.

When the voltage of power grid 106 is positive and greater than the voltage of photovoltaic panel 102, transistor 164 remains on, and transistor 196 is the main switching transistor. Transistor 196 produces two voltage levels from the DC output voltage and the photovoltaic panel output voltage. Part of the power is drawn directly from photovoltaic panel 102, and part of the power is drawn from photovoltaic panel 102 through DC-to-DC power converter 143.

When the power grid voltage is negative and greater than the photovoltaic panel output voltage minus the DC output voltage, transistor 162 remains on, and transistor 198 is the main switching transistor. When the power grid voltage is negative and less than the photovoltaic panel output minus the DC output voltage, transistor 162 remains on and transistor 194 is the main switching transistor.

Figure 8:
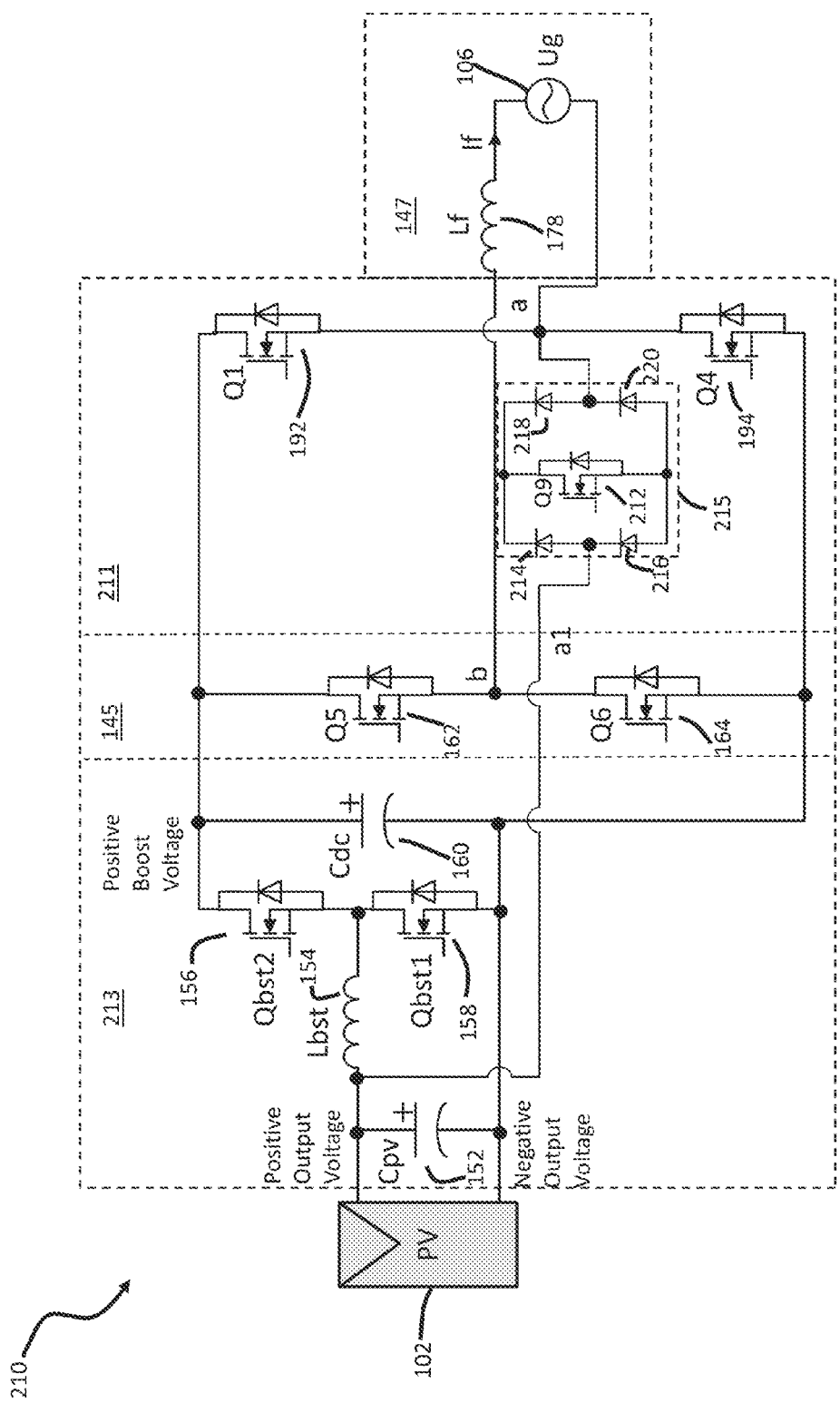
FIG. 8 illustrates a schematic of another embodiment power converter circuit.

FIG. 8 illustrates power converter circuit 210. Photovoltaic panel 102, inverter stage 145, and power grid module 147 are similar to those in power converter circuit 150. In one example, DC-to-DC power converter 213 is similar to DC-to-DC power converter 143 in power converter circuit 150. In another example, DC-to-DC power converter 213 is similar to DC-to-DC power converter 141 in power converter circuit 180. DC-to-DC power converter 142 converts a portion of the power output by photovoltaic panel 102 to a DC output. Then, inverter stage 145 converts a portion of the DC output power to an AC power, which is output to power grid module 147.

Similar to inverter stage 199, inverter stage 211 contains transistor 192 and transistor 194 coupled in series to the DC output. Transistor 192, transistor 194, and the AC output of inverter stage 211 is coupled to power grid module 147 via node a. Bidirectional switch 215 is coupled between the AC output of inverter stage 211 and the output of photovoltaic panel 102, and contains transistor 212 and diodes 214, 216, 218, and 220. In some cases, the conversion efficiency of inverter stage 211 is lower than that of inverter stage 199 or inverter stage 149, because there is an additional diode, which results in higher conduction losses. However, inverter stage 211 contains fewer transistors than inverter stage 199 and inverter stage 149. Transistor 212 is activated using a control signal that is the logical AND of the control signal used to activate transistors Q2 and Q3 in the embodiment shown in FIG. 5.

Figure 9:
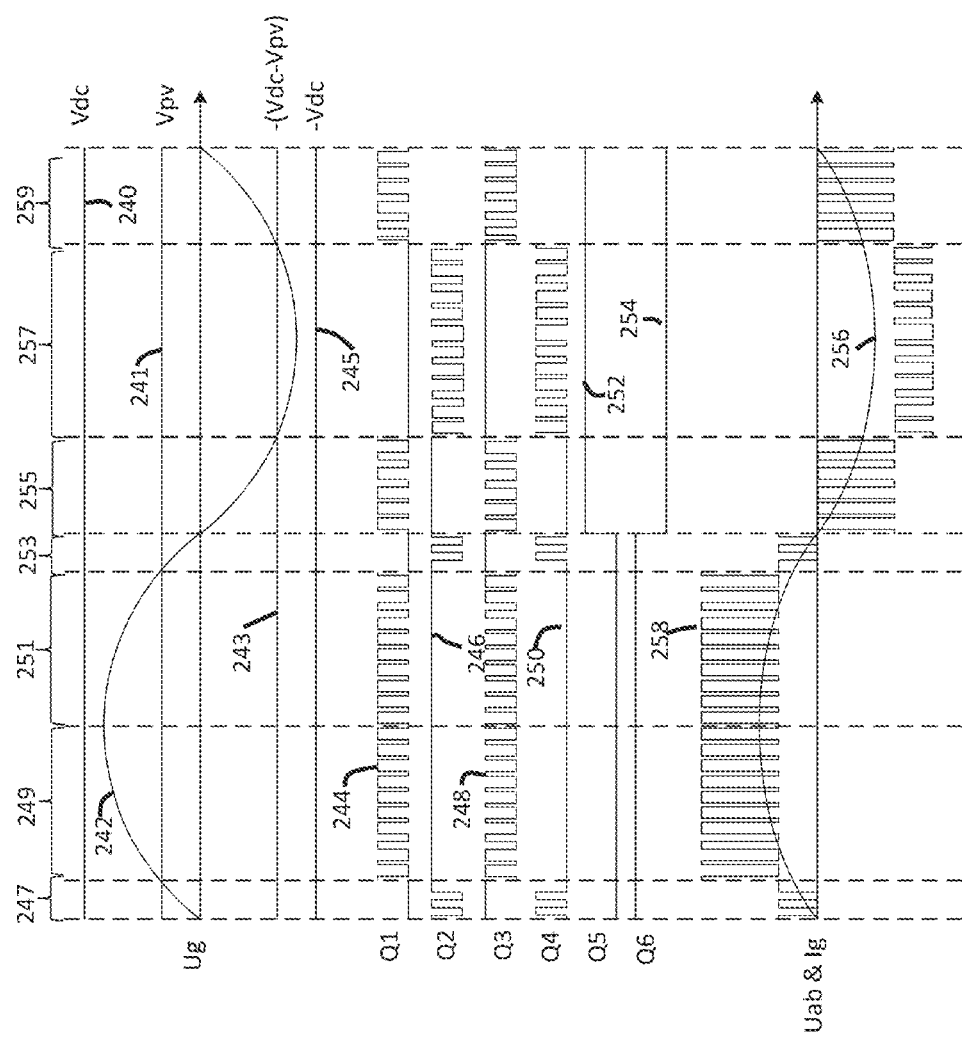
FIG. 9 illustrates graphs of voltage and current versus time for an embodiment power converter circuit.

FIG. 9 illustrates graphs of voltage and current versus time for power converter circuit 150. Curve 242 represents the sinusoidal voltage of power grid 106 (Ug), curve 241 represents the DC output voltage of photovoltaic panel 102 (Vpv), curve 240 represents the DC output voltage of DC-to-DC power converter 143 (Vdc), curve 245 represents the negative DC voltage across DC-to-DC power converter 143 (−Vdc), and curve 243 represents the negative of the difference between the DC output voltage and the voltage output from photovoltaic panel 102—(Vdc−Vpv). Furthermore, curve 244 represents the voltage across transistor 166, curve 246 shows the voltage across transistor 170, curve 248 represents the voltage across transistor 172, curve 250 shows the voltage across transistor 176, curve 252 represents the voltage across transistor 162, and curve 254 represents the voltage across transistor 164, and curve 256 represents the current through power grid module 147 (If), while curve 258 shows the voltage across power grid module 147.

The circuit operation is divided into regions based on the power grid voltage in relation to the photovoltaic panel output voltage and the DC output voltage. In region 247, the power grid voltage positive represented by curve 242 and is less than the voltage from the photovoltaic panel represented by curve 241. Transistor 166, represented by curve 244, and transistor 162, represented by curve 252, are off, while transistor 164, represented by curve 254, is on and clamped to the negative DC output voltage of DC-to-DC power converter 142. Main switching transistor 170 and transistor 176 switch in region 247. The body diode of transistor 172, represented by curve 248 forms a freewheeling path when transistor 170 is off. In this region, power is directly drawn from photovoltaic panel 102, and DC-to-DC power converter 143 consumes very little active power.

Then, in region 249, the voltage of the power grid is positive and greater than the output voltage of the photovoltaic panel, and is increasing. In region 251, the voltage of the power grid 106 is positive and greater than the output voltage of the photovoltaic panel 102, but decreasing. In regions 249 and 251, the control voltage of transistor 170, represented by curve 246, remains on, and transistor 166, represented by curve 244, is the main switching transistor. Transistor 172, represented by curve 248, also switches in region 249. Transistor 166 produces two voltage levels from the DC output voltage and the photovoltaic panel output voltage. Part of the power is drawn directly from photovoltaic panel 102, and part of the power is drawn from photovoltaic panel 102 through DC-to-DC power converter 143.

In region 253, the power grid voltage is positive and less than the photovoltaic panel output voltage. As in region 247, the control voltage of transistor 170, represented by curve 246, is the main switching transistor, while transistor 166, represented by curve 244, is off, and transistor 176, represented by curve 250, switches in region 253. The body diode of transistor 172, represented by curve 248 forms a freewheeling path when transistor 170 is off DC-to-DC power converter 143 consumes very little active power in region 253, because power is directly drawn from photovoltaic panel 102.

In region 255, the power grid voltage is negative and greater than the photovoltaic panel output voltage minus the DC output voltage. The control voltage of transistor 162, represented by curve 252, remains on, while the control voltage of transistor 172, represented by curve 248, is the main switching transistor, and transistor 166, represented by curve 244, switches in region 255. The body diode of transistor 170, represented by curve 246, forms a freewheeling path when transistor 172 is off, and provides a zero voltage vector. Transistor 164, represented by curve 254, remains off. Also, in region 257, the power grid voltage is negative and less than the photovoltaic panel output voltage minus the DC output voltage. Transistor 176, represented by curve 250, is the main switching transistor, and transistor 172, represented by curve 248, remains on, while transistor 170, represented by curve 246, switches in region 257.

As in region 255, in region 259, the power grid voltage is negative and greater than the photovoltaic panel output voltage minus the DC output voltage. The control voltage of transistor 172, represented by curve 248, is the main switching transistor, while transistor 176, represented by curve 250, remains on, and transistor 166, represented by curve 244, switches in region 259.

When reactive power is needed, transistors 166 and 170 switch complementarily with transistors 172 and 176. In this case, the switching loss is slightly higher than when no reactive power is needed.

Figure 10:
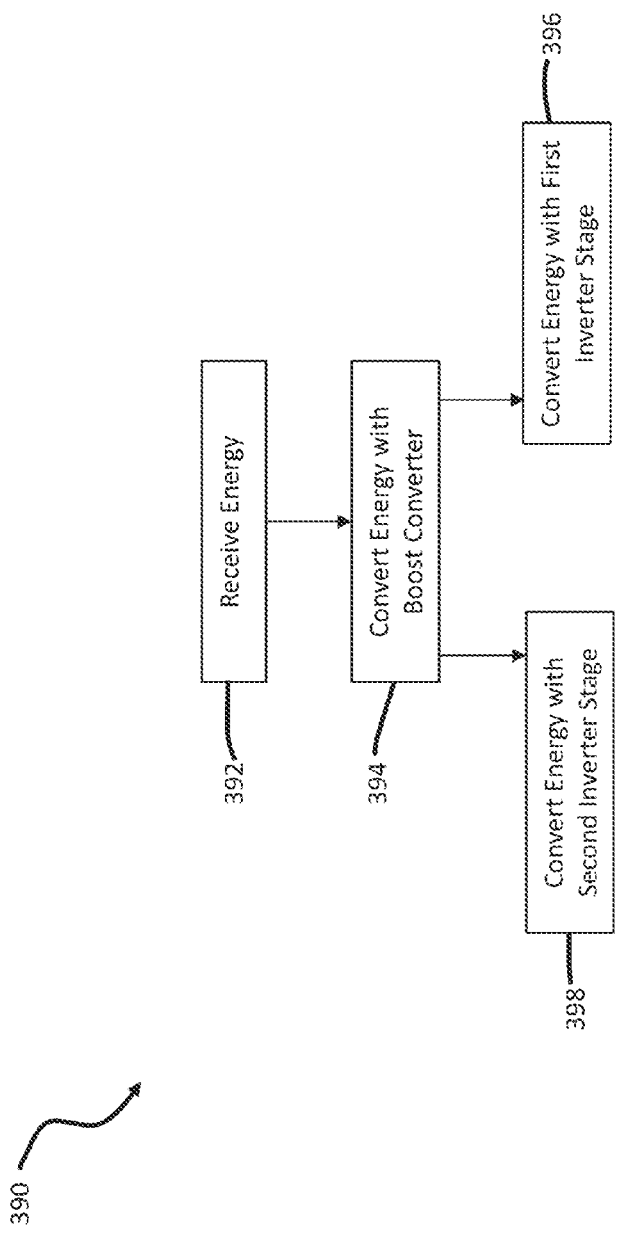
FIG. 10 illustrates a block diagram of an embodiment method.

FIG. 10 illustrates flowchart 390 of a method of power conversion. Initially, in step 392, energy is received. In one example, the energy is received from a photovoltaic panel that converts solar energy into electrical energy in the form of a DC output voltage. Then, in step 394, the received energy is converted to a higher DC voltage by a DC-to-DC power converter that may be implemented using, a boost converter, a buck converter, or another converter type. Next, in step 396, the DC output by the DC-to-DC power converter is converted by a first inverter to an AC voltage. In one example, the first inverter is a two-level bridge. The AC voltage produced by the first inverter is output to a power grid.

In step 398, a second inverter converts DC voltage energy to an AC voltage. In one example, during one region of operation, only the received energy is directly converted to an AC voltage, and the output of the DC-to-DC power converter is not used. During another region of operation, both a portion of the received and a portion of the energy converted by the DC-to-DC power converter are converted to an AC output voltage. In one example, the second inverter is a neutral point clamped three-level bridge. The AC voltage output by the second inverter is coupled to a power grid.

Figure 11:
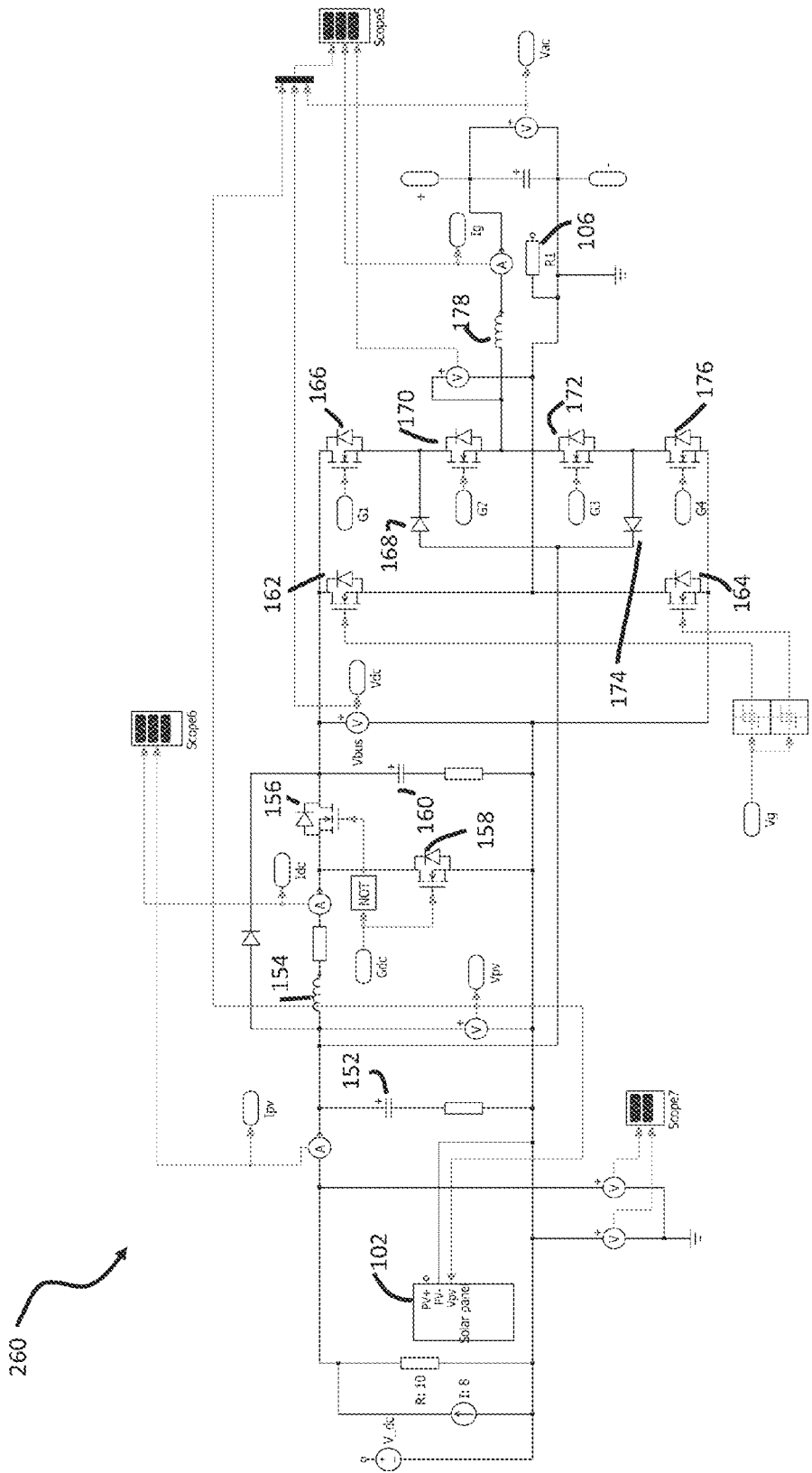
FIG. 11 illustrates a simulation schematic for an embodiment power converter circuit.
Figure 12:
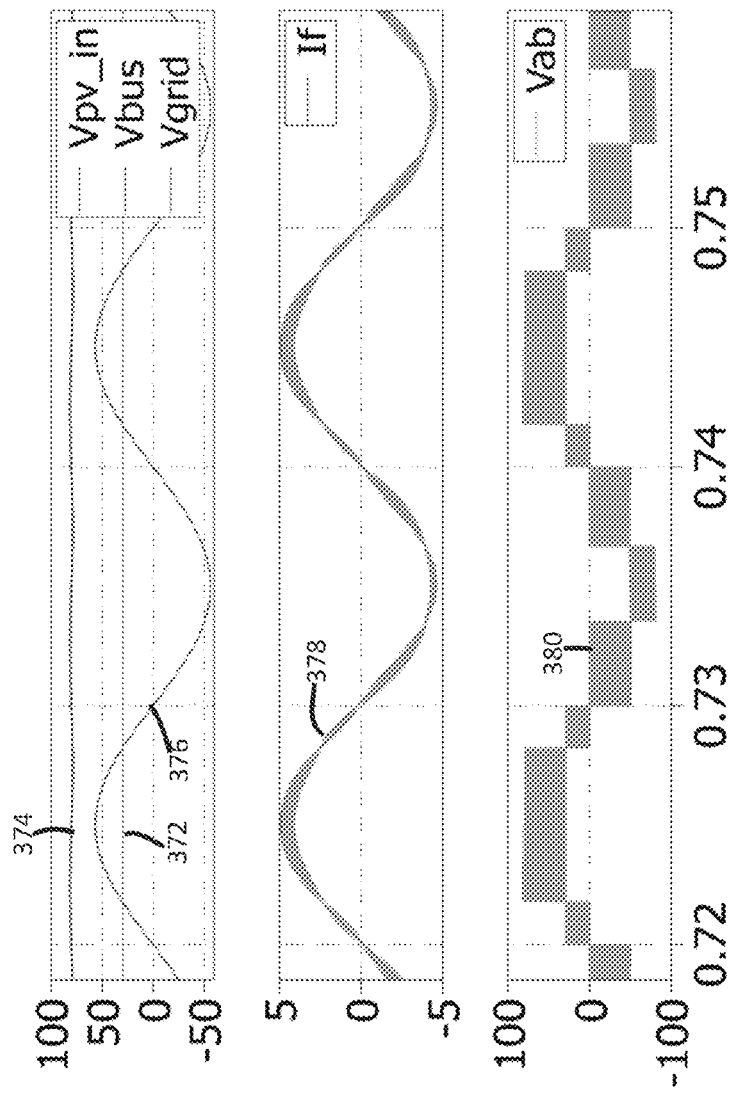
FIG. 12 illustrates graphs of voltage and current versus time for a simulated power converter circuit.

FIG. 11 illustrates simulation schematic 260 of power converter circuit 150. FIG. 12 illustrates graphs of voltage and current versus time for the results of simulation schematic 260. Curve 374 shows the DC output voltage by DC-to-DC power converter 142, and curve 372 shows the output voltage of photovoltaic panel 102. Curve 376 shows the voltage of power grid 106, and curve 378 shows the current of power grid module 147. Also, curve 380 shows the voltage of power grid module 146.

An embodiment inverter circuit includes a DC-to-DC power configured to receive an input energy from a device via a first input terminal and a second input terminal, where the DC-to-DC power converter is configured to convert a first portion of the input energy to a DC energy. The inverter circuit also includes an inverter stage coupled to an output of the DC-to-DC power converter, and is connected to the first input terminal of the DC-to-DC power converter and the second input terminal of the DC-to-DC power converter, where the inverter stage is configured to convert a second portion of the input energy to a first output energy. In an example, the inverter stage is further configured to convert a third portion of the DC energy to a second output energy.

In another example, the DC-to-DC power converter includes a first inductor coupled to the first input terminal of the DC-to-DC power converter and a first capacitor coupled between the first input terminal of the DC-to-DC power converter and the second input terminal of the DC-to-DC power converter. The DC-to-DC power converter also includes a first transistor coupled between the second input terminal of the DC-to-DC power converter and the first inductor and a second transistor coupled to the first inductor and the first transistor.

In an additional example, the DC-to-DC power converter includes a first inductor coupled to the first input terminal of the DC-to-DC power converter and a first capacitor coupled between the first input terminal of the DC-to-DC power converter and the second input terminal of the DC-to-DC power converter. The DC-to-DC power converter also includes a first transistor coupled between the second input terminal of the DC-to-DC power converter and the first inductor and a first diode coupled to the first inductor and the first transistor. In another embodiment, the inverter stage is directly connected to the first input terminal of the DC-to-DC power converter and the second input terminal of the DC-to-DC power converter, and the inverter stage is configured to convert the second portion of the input energy directly to the first output energy. In an embodiment, the inverter stage is a neutral point clamped three level bridge. The inverter stage may be further configured to be coupled to an AC power source. In another example, the device includes a photovoltaic panel.

In an example, an inverter circuit includes a DC-to-DC power converter configured to receive an input energy from a device via a first input terminal and a second input terminal, and to convert a first portion of the input energy to a DC energy. Additionally, the inverter circuit includes a first inverter stage coupled to a first output of the DC-to-DC power converter, the second input terminal of the DC-to-DC power converter, and a first grid terminal. The inverter circuit also includes a second inverter stage coupled to the first output of the DC-to-DC power converter, the second input terminal of the DC-to-DC power converter, and a second grid terminal of the DC-to-DC power converter, where the second inverter stage is connected to the first input terminal of the DC-to-DC power converter and the second input terminal of the DC-to-DC power converter.

In another example, the DC-to-DC power converter is a boost converter and/or the first inverter is a two-level bridge. The first inverter stage may include a first transistor coupled between the first output of the DC-to-DC power converter and the first grid terminal and a second transistor coupled between the first grid terminal and the second input terminal of the DC-to-DC power converter. In an additional example, the first inverter is configured to operate at line-frequency switching.

In another example, the second inverter stage includes a first transistor coupled between the first output of the DC-to-DC power converter and a second node and a second transistor coupled between the second node and the second grid terminal. The second inverter stage also includes a third transistor coupled between the second grid terminal and a third node and a fourth transistor coupled between the third node and the second input terminal of the DC-to-DC power converter. Additionally, the second inverter stage includes a first diode coupled between the second node and the first input terminal of the DC-to-DC power converter and a second diode coupled between the third node and the first input terminal of the DC-to-DC power converter.

In an additional example, the second inverter stage includes a first transistor coupled between the first output of the DC-to-DC power converter and the second grid terminal and a second transistor coupled between the second grid terminal and the second input terminal of the DC-to-DC power converter. Also, the second inverter stage includes a third transistor coupled between the second grid terminal and a second node and a fourth transistor coupled between the second node and the first input terminal of the DC-to-DC power.

In another example, the second inverter stage includes a first transistor coupled between the first output of the DC-to-DC power converter and the second grid terminal and a second transistor coupled between the second grid terminal and the second input terminal of the DC-to-DC power converter. The second inverter stage also includes a first diode coupled between the second grid terminal and a second node and a second diode coupled between the second node and the first input terminal of the DC-to-DC power converter. Additionally, the second inverter stage includes a third diode coupled between the second grid terminal and a third node and a third transistor coupled between the second node and the third node. Also, the second inverter stage includes a fourth diode coupled between the first input terminal of the DC-to-DC power converter and the third node. In an additional example, the first grid terminal and the second grid terminal are configured to be coupled to an AC power source. In another example, the device is a photovoltaic panel.

In an example, a method of converting photovoltaic energy includes receiving input energy from a photovoltaic panel and converting a first portion of the input energy to a first converted energy by a DC-to-DC power converter, where the first converted energy includes less energy than the input energy. Additionally, the method includes converting a second portion of the input energy to a second converted energy by a first inverter stage. The method may also include converting a third portion of the first converted energy to a third converted energy by the first inverter stage. Moreover, the method may include converting a fourth portion of the second converted energy to a fourth converted energy by a second inverter stage.

In an embodiment, only a portion of the received energy is converted by a DC-to-DC power converter, so that the power loss of the DC-to-DC power converter is less than one that converts the full input power. In an example, the switching losses of the first inverter are negligible compared to the conduction losses. The efficiency of the second inverter is very high, because only one active switch operates at a time in some embodiments. Advantages of an embodiment include the ability to handle wide variations in the input voltage in a buck and/or boost mode. Also, an embodiment has a good efficiency while handling a wide variation of input voltages. An additional advantage of an embodiment includes operating the DC side of an inverter of an embodiment at low frequencies, which reduces leakage current. In an example, the switching voltage stress is lower, because a voltage clamped type of modulation is used. In another example, a boost converter only transfers a portion of the photovoltaic power to a DC link. In an additional embodiment, the second inverter stage is directly connected to the first input terminal of the DC-to-DC power converter and the second input terminal of the DC-to-DC power converter.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An inverter circuit comprising:
    a direct current (DC), DC-to-DC power converter configured to receive an input energy from a DC device via a first, positive input terminal and a second, negative input terminal and to convert a first portion of the input energy to a higher voltage DC energy;
    a first inverter stage wherein:
        the first inverter stage is a two-level bridge,
        a first input of the first inverter stage is coupled to a first positive DC voltage output of the DC-to-DC power converter,
        a second input of the first inverter stage is coupled to the second, negative input terminal of the DC-to-DC power converter, and
        an output of the first inverter stage is coupled to a first grid terminal; and
    a second inverter stage wherein:
        the second inverter stage comprises a three level bridge,
        a first input of the second inverter stage is coupled to the first positive DC voltage output of the DC-to-DC power converter,
        a second input of the second inverter stage is coupled to a positive output of the DC device,
        a third input of the second inverter stage is coupled to a negative output of the DC device, and
        an output of the second inverter stage is coupled to a second grid terminal.

2. The inverter circuit of claim 1, wherein the second inverter stage is directly connected to the first, positive input terminal of the DC-to-DC power converter and the second, negative input terminal of the DC-to-DC power converter.

3. The inverter circuit of claim 1, wherein the first inverter stage comprises:
    a first transistor coupled between the first, positive output of the DC-to-DC power converter and the first grid terminal; and
    a second transistor coupled between the first grid terminal and the second, negative input terminal of the DC-to-DC power converter.

4. The inverter circuit of claim 1, wherein the first grid terminal and the second grid terminal are configured to be coupled to an alternating current (AC) power source.

5. The inverter circuit of claim 1, wherein the DC device is a photovoltaic panel.

6. The inverter circuit of claim 1, wherein the second inverter stage is configured to deliver energy to the second grid terminal by selectively converting energy from the output of the DC-to-DC power converter at a first time and bypassing the DC-to-DC power converter and converting energy directly from the DC device at a second time.

7. The inverter circuit of claim 1, wherein the first inverter stage is configured to deliver energy to the first grid terminal by converting energy from the output of the DC-to-DC power converter.

8. An inverter circuit comprising:
a direct current (DC), DC-to-DC power converter configured to receive an input energy from a DC device via a first, positive input terminal and a second, negative input terminal and to convert a first portion of the input energy to a higher voltage DC energy;
a first inverter stage
configured to operate at line-frequency switching wherein:
a first input of the first inverter stage is coupled to a first positive DC voltage output of the DC-to-DC power converter,
a second input of the first inverter stage is coupled to the second, negative input terminal of the DC-to-DC power converter, and
an output of the first inverter stage is coupled to a first grid terminal; and
a second inverter stage wherein:
the second inverter stage comprises a three level bridge,
a first input of the second inverter stage is coupled to the first positive DC voltage output of the DC-to-DC power converter,
a second input of the second inverter stage is coupled to a positive output of the DC device,
a third input of the second inverter stage is coupled to a negative output of the DC device, and
an output of the second inverter stage is coupled to a second grid terminal.

9. The inverter circuit of claim 8, wherein the second inverter stage is configured to deliver energy to the second grid terminal by selectively:
converting energy from the output of the DC-to-DC power converter at a first time; and
bypassing the DC-to-DC power converter and converting energy directly from the DC device at a second time.

10. The inverter circuit of claim 8, wherein the DC device is a photovoltaic panel.

11. The inverter circuit of claim 8, wherein the first inverter stage comprises:
a first transistor coupled between the first, positive output of the DC-to-DC power converter and the first grid terminal; and
a second transistor coupled between the first grid terminal and the second, negative input terminal of the DC-to-DC power converter.

12. An inverter circuit comprising:
a direct current (DC), DC-to-DC power converter configured to receive an input energy from a DC device via a first, positive input terminal and a second, negative input terminal and to convert a first portion of the input energy to a higher voltage DC energy;
a first inverter stage wherein:
a first input of the first inverter stage is coupled to a first positive DC voltage output of the DC-to-DC power converter,
a second input of the first inverter stage is coupled to the second, negative input terminal of the DC-to-DC power converter, and
an output of the first inverter stage is coupled to a first grid terminal; and
a second inverter stage comprising:
a first transistor coupled between the first, positive output of the DC-to-DC power converter and a second node;
a second transistor coupled between the second node and the second grid terminal;
a third transistor coupled between the second grid terminal and a third node;
a fourth transistor coupled between the third node and the second, negative input terminal of the DC-to-DC power converter;
a first diode coupled between the second node and the first, positive input terminal of the DC-to-DC power converter; and
a second diode coupled between the third node and the first, positive input terminal of the DC-to-DC power converter; wherein:
the second inverter stage comprises a three level bridge,
a first input of the second inverter stage is coupled to the first positive DC voltage output of the DC-to-DC power converter,
a second input of the second inverter stage is coupled to a positive output of the DC device,
a third input of the second inverter stage is coupled to a negative output of the DC device, and
an output of the second inverter stage is coupled to a second grid terminal.

13. The inverter circuit of claim 12, wherein the DC device is a photovoltaic panel.

14. The inverter circuit of claim 12, wherein the second inverter stage is configured to deliver energy to the second grid terminal by selectively:
converting energy from the output of the DC-to-DC power converter at a first time; and
bypassing the DC-to-DC power converter and converting energy directly from the DC device at a second time.

15. An inverter circuit comprising:
a direct current (DC), DC-to-DC power converter configured to receive an input energy from a DC device via a first, positive input terminal and a second, negative input terminal and to convert a first portion of the input energy to a higher voltage DC energy;
a first inverter stage wherein:
a first input of the first inverter stage is coupled to a first positive DC voltage output of the DC-to-DC power converter,
a second input of the first inverter stage is coupled to the second, negative input terminal of the DC-to-DC power converter, and
an output of the first inverter stage is coupled to a first grid terminal; and
a second inverter stage comprising:
a first transistor coupled between the first, positive output of the DC-to-DC power converter and the second grid terminal;
a second transistor coupled between the second grid terminal and the second, negative input terminal of the DC-to-DC power converter;
a third transistor coupled between the second grid terminal and a second node;
and a fourth transistor coupled between the second node and the first, positive input terminal of the DC-to-DC power converter; wherein:
the second inverter stage comprises a three level bridge,
a first input of the second inverter stage is coupled to the first positive DC voltage output of the DC-to-DC power converter,
a second input of the second inverter stage is coupled to a positive output of the DC device,
a third input of the second inverter stage is coupled to a negative output of the DC device, and an output of the second inverter stage is coupled to a second grid terminal.

16. The inverter circuit of claim 15, wherein the DC device is a photovoltaic panel.

17. The inverter circuit of claim 15, wherein the second inverter stage is configured to deliver energy to the second grid terminal by selectively:
   converting energy from the output of the DC-to-DC power converter at a first time; and
   bypassing the DC-to-DC power converter and converting energy directly from the DC device at a second time.

18. An inverter circuit comprising:
   a direct current (DC), DC-to-DC power converter configured to receive an input energy from a DC device via a first, positive input terminal and a second, negative input terminal and to convert a first portion of the input energy to a higher voltage DC energy;
   a first inverter stage wherein:
      a first input of the first inverter stage is coupled to a first positive DC voltage output of the DC-to-DC power converter,
      a second input of the first inverter stage is coupled to the second, negative input terminal of the DC-to-DC power converter, and
      an output of the first inverter stage is coupled to a first grid terminal; and
   a second inverter stage comprising:
      a first transistor coupled between the first, positive output of the DC-to-DC power converter and the second grid terminal;
      a second transistor coupled between the second grid terminal and the second, negative input terminal of the DC-to-DC power converter;
      a first diode coupled between the second grid terminal and a second node;
      a second diode coupled between the second node and the first, positive input terminal of the DC-to-DC power converter;
      a third diode coupled between the second grid terminal and a third node;
      a third transistor coupled between the second node and the third node; and
      a fourth diode coupled between the first, positive input terminal of the DC-to-DC power converter and the third node; wherein:
      the second inverter stage comprises a three level bridge,
      a first input of the second inverter stage is coupled to the first positive DC voltage output of the DC-to-DC power converter,
      a second input of the second inverter stage is coupled to a positive output of the DC device,
      a third input of the second inverter stage is coupled to a negative output of the DC device, and
      an output of the second inverter stage is coupled to a second grid terminal.

19. The inverter circuit of claim 18, wherein the DC device is a photovoltaic panel.

20. The inverter circuit of claim 18, wherein the second inverter stage is configured to deliver energy to the second grid terminal by selectively:
   converting energy from the output of the DC-to-DC power converter at a first time; and
   bypassing the DC-to-DC power converter and converting energy directly from the DC device at a second time.

* * * * *